United States Patent
Bucy et al.

(10) Patent No.: US 10,953,819 B2
(45) Date of Patent: Mar. 23, 2021

(54) VEHICLE INTERIOR TRIM

(71) Applicant: KASAI NORTH AMERICA, INC., Murfreesboro, TN (US)

(72) Inventors: Troy Bucy, Manchester, TN (US); Bill Drown, Manchester, TN (US); Austin Hawks, Murfreesboro, TN (US); Kyle Dodley, Murfreesboro, TN (US); Paul Bellemare, Murfreesboro, TN (US)

(73) Assignee: KASAI NORTH AMERICA, INC., Murfreesboro, TN (US)

( * ) Notice: Subject to any disclaimer, the term of this patent is extended or adjusted under 35 U.S.C. 154(b) by 136 days.

(21) Appl. No.: 16/449,925

(22) Filed: Jun. 24, 2019

(65) Prior Publication Data

US 2020/0398768 A1 Dec. 24, 2020

(51) Int. Cl.
*B60R 13/02* (2006.01)
*H01Q 1/32* (2006.01)
*B32B 7/12* (2006.01)
*B32B 37/18* (2006.01)
*B32B 38/00* (2006.01)
*B32B 27/12* (2006.01)
*B32B 27/32* (2006.01)
*B32B 5/24* (2006.01)

(52) U.S. Cl.
CPC .......... *B60R 13/0212* (2013.01); *B32B 5/245* (2013.01); *B32B 7/12* (2013.01); *B32B 27/12* (2013.01); *B32B 27/32* (2013.01); *B32B 37/182* (2013.01); *B32B 38/0004* (2013.01); *H01Q 1/3275* (2013.01); *B32B 2255/02* (2013.01); *B32B 2255/205* (2013.01); *B32B 2605/003* (2013.01); *B60R 2013/0287* (2013.01)

(58) Field of Classification Search
CPC ........ B60R 13/0212; B60R 2013/0287; B32B 38/0004; B32B 27/32; B32B 27/12; B32B 5/245; B32B 7/12; B32B 37/182; B32B 2255/02; B32B 2605/003; B32B 2255/205; H01Q 1/3275
See application file for complete search history.

(56) References Cited

U.S. PATENT DOCUMENTS

| | | | | |
|---|---|---|---|---|
| 6,756,945 B2 * | 6/2004 | Mizutani | ............... | H01Q 1/3275 343/713 |
| 7,569,947 B2 * | 8/2009 | Imai | ....................... | B60R 13/02 307/9.1 |
| 8,486,522 B2 * | 7/2013 | Jokisch | ................... | B32B 27/18 428/316.6 |
| 2013/0164528 A1 | 6/2013 | Nomura et al. | | |
| 2018/0176783 A1 * | 6/2018 | Quarta | ................. | H01Q 1/3233 |
| 2018/0337460 A1 * | 11/2018 | Kinsler | ..................... | B32B 7/10 |

* cited by examiner

*Primary Examiner* — Pinel E Romain
(74) *Attorney, Agent, or Firm* — United IP Counselors, LLC

(57) ABSTRACT

A vehicle interior trim includes a skin layer arranged toward inside of a vehicle interior, a base material layer arranged toward outside of the vehicle interior from the skin layer, a reinforcement layer arranged on the base material layer, an air impermeable layer arranged on the reinforcement layer, the air impermeable layer configured to interfere with a radio signal, the air impermeable layer having a cutout, and a radio signal transmission layer arranged on the reinforcement layer, the radio signal transmission layer exposed from the cutout.

16 Claims, 9 Drawing Sheets

VEHICLE INTERIOR TRIM

BACKGROUND

1. Technical Field

The present invention relates to a vehicle interior trim.

2. Description of the Background

A conventional vehicle interior trim includes an aluminum vapor deposition film arranged on the entire back surface thereof to suppress an increase of temperature inside a vehicle cabin caused by solar load (For example, U.S. Patent Application Publication No. 2013/0164528).

BRIEF SUMMARY

The conventional vehicle interior trim, which includes an aluminum vapor deposition film arranged on the entire back surface thereof, interferes with radio signals passing through to the vehicle cabin.

The present invention aims to provide a vehicle interior trim that suppresses an increase of temperature inside a vehicle cabin while allowing radio signals to pass inside the vehicle cabin.

One or more aspects of the present invention provides a vehicle interior trim, including:

a skin layer arranged toward an inside of a vehicle interior;

a base material layer arranged toward outside of the vehicle interior from the skin layer;

a reinforcement layer arranged on the base material layer;

an air impermeable layer arranged on the reinforcement layer, the air impermeable layer having one or more characteristics that interfere with a radio signal, the air impermeable layer having a cutout; and a radio signal transmission layer arranged on the reinforcement layer, the radio signal transmission layer exposed from the cutout.

DETAILED DESCRIPTION

Figure 1:
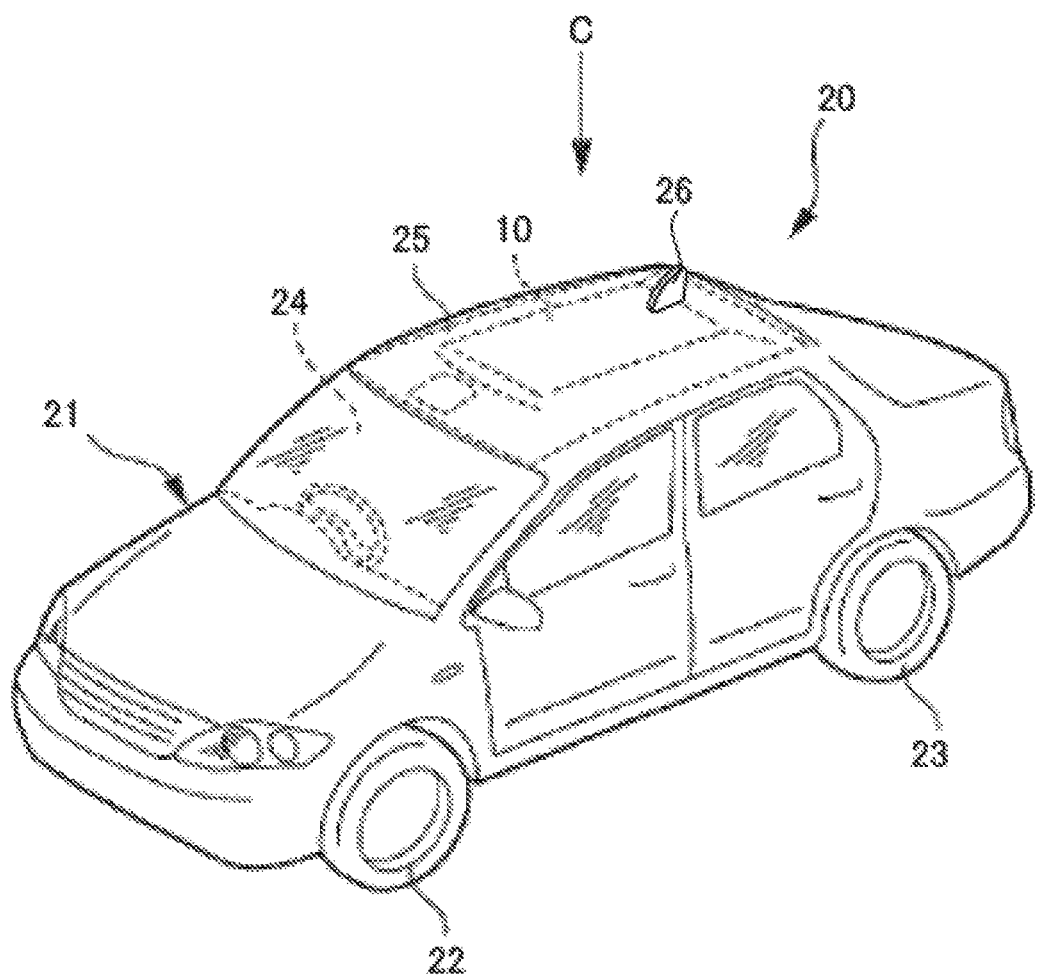
FIG. 1 is a perspective view showing a vehicle including a vehicle interior trim of the embodiment.

A vehicle interior trim according to an embodiment is described below in view of drawings. FIG. 1 is a perspective view showing a vehicle 20 including a vehicle interior trim 10 of the embodiment. As shown in FIG. 1, a vehicle 20 includes a vehicle body 21, front wheels 22, rear wheels 23, a vehicle cabin 24, and an antenna 26. The vehicle body 21 includes a roof 25 which covers the upper side of the vehicle cabin 24. The inner side of the roof 25 faces inside the vehicle cabin 24, which furnishes the roof surface. The antenna 26 is mounted on the roof 25.

Figure 2:
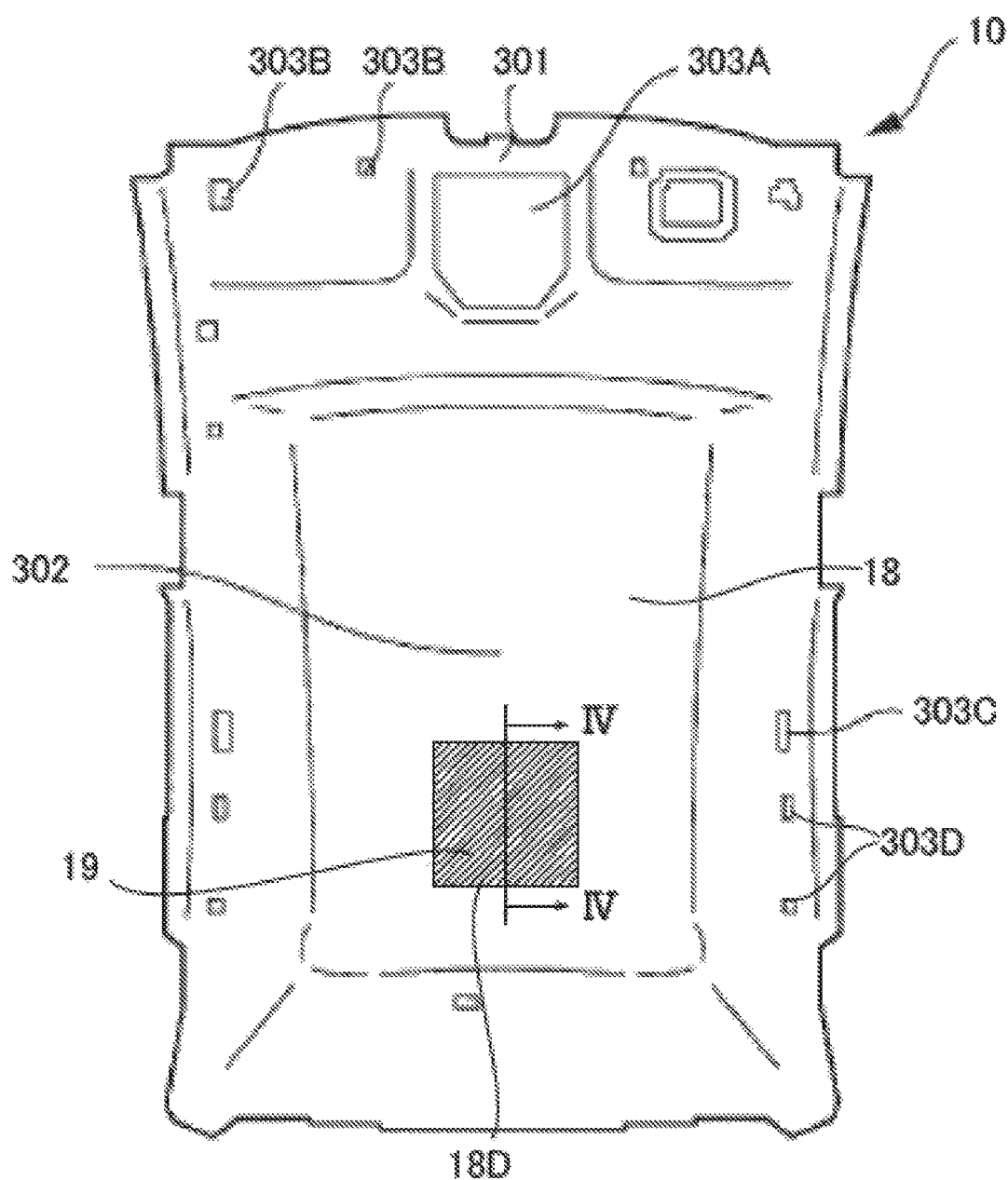
FIG. 2 is a plan view of the vehicle interior trim viewed from the direction of arrow C in FIG. 1.

FIG. 2 is a plan view of the vehicle interior trim 10 viewed from the direction of arrow C in FIG. 1. As shown in FIG. 2, a vehicle interior trim 10 is substantially rectangular. The vehicle interior trim 10 includes a front portion 301 and a curved portion 302. The front portion 301 is formed in substantially planer shape. The curved portion 302, which is disposed rearward from the front portion 301, has a height that gets higher toward the center of the curved portion 302. The vehicle interior trim 10 includes openings 303A, 303B, 303C. The opening 303A is for a roof console which packages sunglass holder, reading light and other telematics functions. The openings 303B are for mounting a sun visor. The openings 303C are for mounting a courtesy room lamp or a reading lamp or air duct. The openings 303D are for mounting a grip.

The vehicle interior trim 10 further includes a cutout 18D. The almost entire back surface of the vehicle interior trim 10 is covered with air impermeable layer 18 except for the cutout 18D. A radio signal transmission layer 19 is exposed through the cutout 18D toward back surface of the vehicle interior trim 10. The air impermeable layer 18, the cutout 18D and the radio signal transmission layer 19 will be described in detail below.

Figure 3:
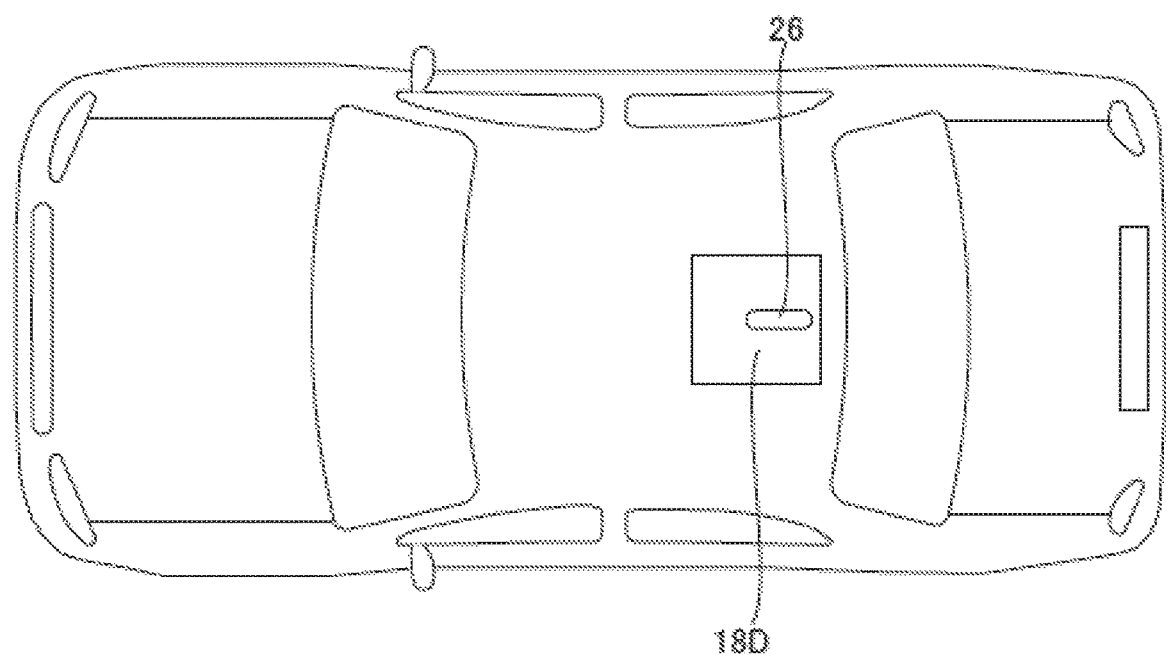
FIG. 3 is a plan view of the vehicle showing a position of an antenna and a cutout.

FIG. 3 is a plan view of the vehicle 20 showing a position of an antenna and a cutout. As shown in FIG. 3, the cutout 18D is located in the vicinity of the antenna 26 in plan view. The cutout 18D is preferably located just under the antenna 26 such that the antenna 26 is completely overlapped with the cutout 18D in plan view. The cutout 18D may be located under the antenna 26 such that the antenna 26 is partially overlapped with the cutout 18D in plan view. Alternatively, the cutout 18D may be located below the antenna 26 such that the antenna 26 is not overlapped with the cutout 18D but located near to the cutout 18D as long as radio signals from the antenna 26 are transmitted to electronic devices mounted inside the vehicle cabin 24.

Figure 4:
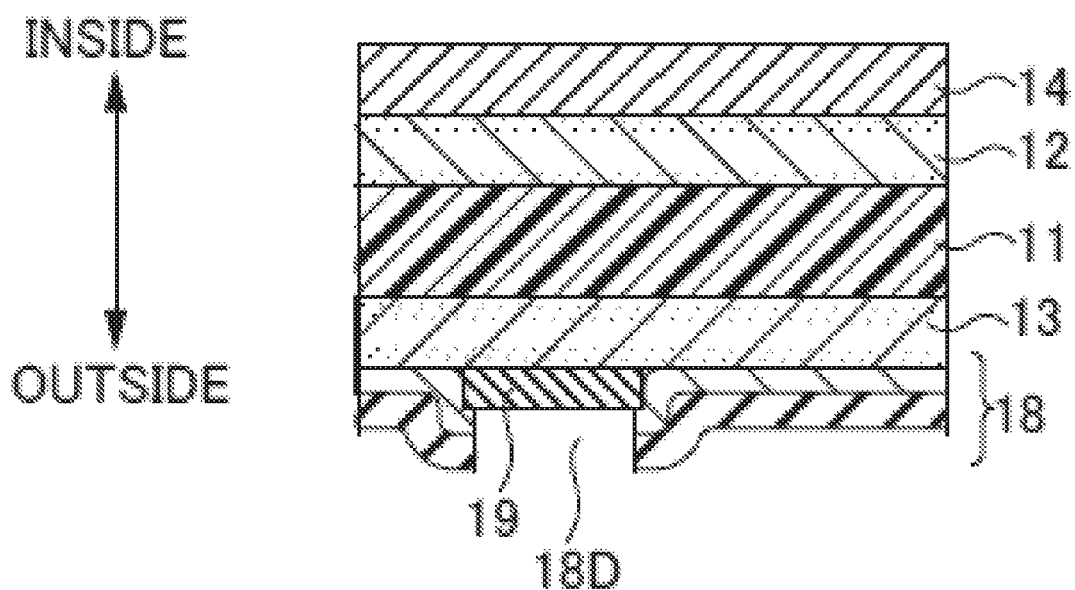
FIG. 4 is a cross sectional view of the vehicle interior trim of the embodiment.

FIG. 4 is a cross sectional view of the vehicle interior trim 10 of the embodiment along IV-IV in FIG. 2. The vehicle interior trim 10 includes a base material layer 11, a fiber layer 12, a reinforcement layer 13, a skin layer 14, the air impermeable layer 18 and the radio signal transmission layer 19. The skin layer 14 is disposed toward inside the vehicle cabin 24. That is, the skin layer 14 is visible from passengers inside the vehicle cabin 24. The skin layer 14, the fiber layer 12, the base material layer 11, the reinforcement layer 13 and the air impermeable layer 18 are disposed in this order from inside toward outside of the vehicle cabin 24. That is, the air impermeable layer 18 is disposed at the back surface of the vehicle interior trim 10, thus the air impermeable layer 18 is invisible from passengers inside the vehicle cabin 24. As shown in FIG. 4, the radio signal transmission layer 19 is disposed on the backside of the reinforcement layer 13. The radio signal transmission layer 19 is exposed toward outside through the cutout 18D.

The base material layer 11 is made of a semi-hard foam material such as an urethane foam, for example. The fiber layer 12 and the reinforcement layer 13 are made of a fiber material such as a glass fiber mat. As described below, an adhesive layer 17 may be arranged on front and back surfaces of the fiber layer 12 and the reinforcement layer 13.

The fiber layer 12 and the reinforcement layer 13 reinforce the vehicle interior trim 10. The skin layer 14 may be any air permeable material such as a non-woven fabric, a woven fabric, or knit.

The air impermeable layer 18 is made of resin film 18B and aluminum vapor deposition film 18A. The aluminum vapor deposition film 18A may have a thickness of 0.01 to 0.09 μm. Thus, the air impermeable layer 18 has an infrared reflecting efficiency of 80 to 90%. Further, the air impermeable layer 18 does not allow air to pass through. Furthermore, the air impermeable layer 18 does not allow radio signals to pass through.

The radio signal transmission layer 19 is made of non-metal material such as plastic sheet material of polypropylene. The radio signal transmission layer 19 may be plastic injection molding component, PSA (Pressure Sensitive Adhesive) tape, or non-woven fabric. The radio signal transmission layer 19 allows radio signals to pass through.

The radio signal transmission layer 19 may be made of air permeable material or air impermeable material. For example, plastic sheet material, plastic injection molding component or PSA tape is air impermeable, while a non-woven fabric is air permeable. Preferably, the radio signal transmission layer 19 is made of air impermeable material. The radio signal transmission layer 19 that is made of air impermeable material does not allow air to pass through.

Figure 5:
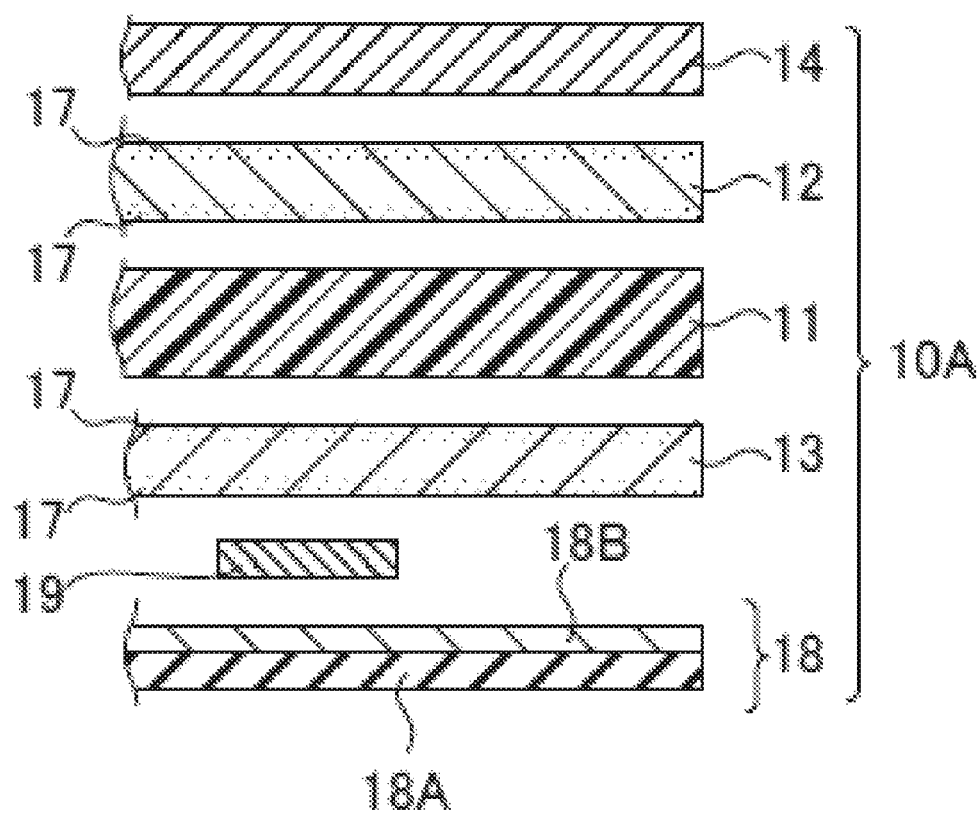
FIG. 5 shows a layer structure of the vehicle interior trim of the embodiment at a time of hot pressing.

Next, a manufacturing method of the vehicle interior trim 10 is described. Firstly, preparing a molding material 10A is described in view of FIG. 5, which shows a layer structure of the vehicle interior trim 10 of the embodiment at a time of hot pressing, which is described below. The molding material 10A includes the skin layer 14, the fiber layer 12, the base material layer 11, the reinforcement layer 13, the radio signal transmission layer 19 and the air impermeable layer 18 disposed in this order. The adhesive layer 17 is coated over both the entire front and back surfaces of each of the fiber layer 12 and the reinforcement layer 13. The adhesive layer 17 is made of a moisture-curable adhesive such as an isocyanate or a thermosetting resin. The air impermeable layer 18 includes a metal deposition film 18A and a resin film 18B. The metal deposition film 18A is made of aluminum, for example.

Figure 6A:
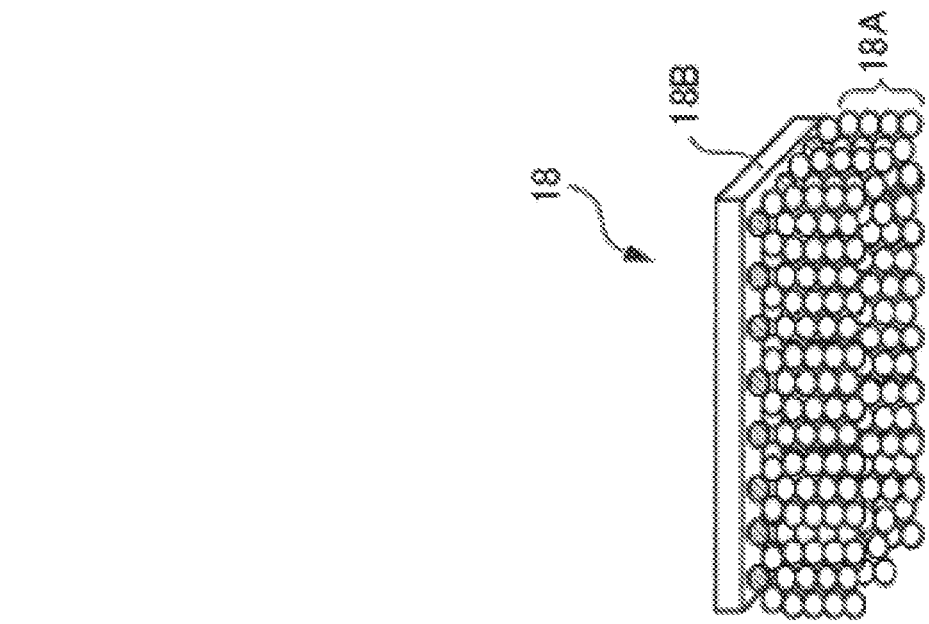
FIGS. 6A to 6C show a manufacturing process of a metal deposition film.
Figure 6B:
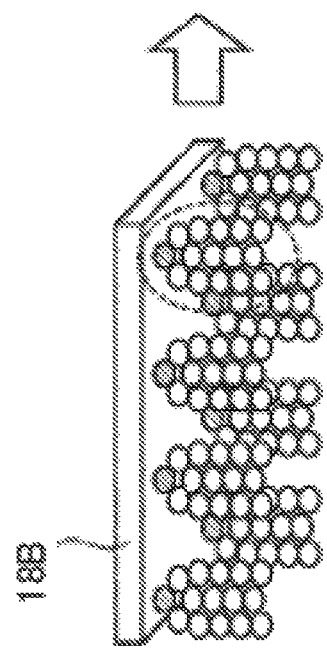
Figure 6C:
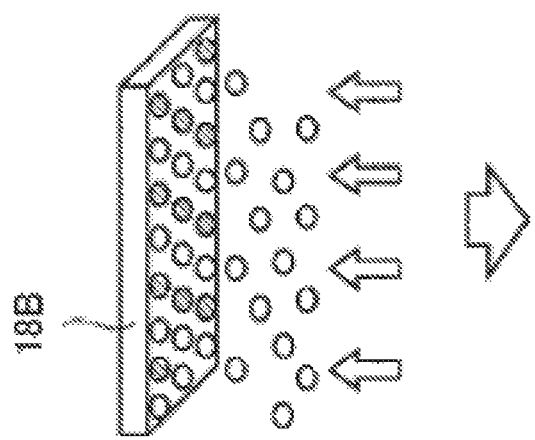

FIGS. 6A to 6C show a manufacturing process of a metal deposition film 18A. As shown in FIG. 6A, aluminum particles, indicated by the white particles, are evaporated from aluminum evaporation source (not shown) which is disposed below the resin film 18B. As indicated by the hatched particles in FIG. 6A, polar groups are produced on a surface of the resin film 18B by applying discharge treatment.

Next, as shown in FIG. 6B, the deposited aluminum particles form a columnar crystal structure as shown in the dotted line at polar group cores. Then, as shown in FIG. 6C, the columnar crystal structure is extended and formed on the entire surface of the resin film 18B, which forms the metal deposition film 18A on the surface of the resin film 18B.

Figure 7:
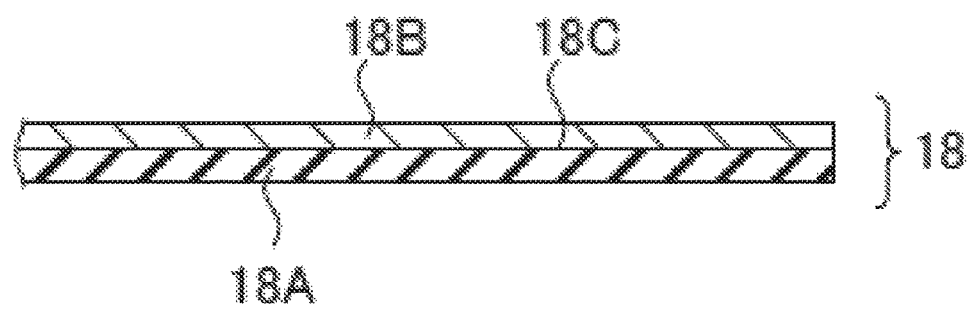
FIG. 7 is a cross sectional view of an air impermeable layer according to the modification of the embodiment.

The air impermeable layer 18 is not limited to the configuration as shown in FIGS. 6A to 6C. For example, as shown in FIG. 7, the air impermeable layer 18 may further include an adhesive 18C between the metal deposition film 18A and the resin film 18B.

Figure 8A:
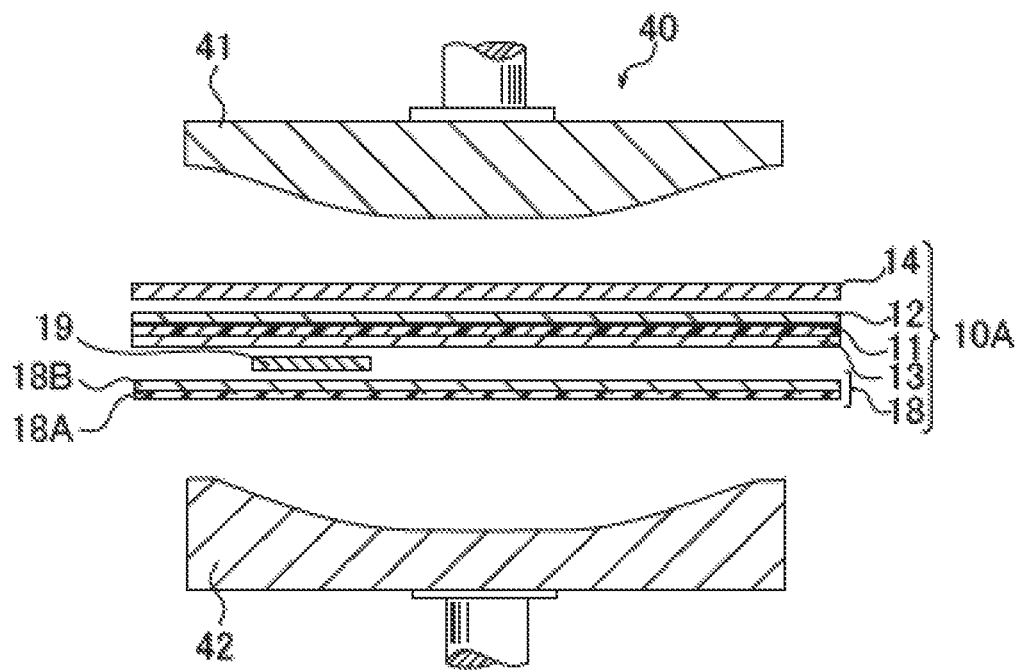
FIGS. 8A and 8B show a manufacturing process of the vehicle interior trim of the embodiment.
Figure 8B:
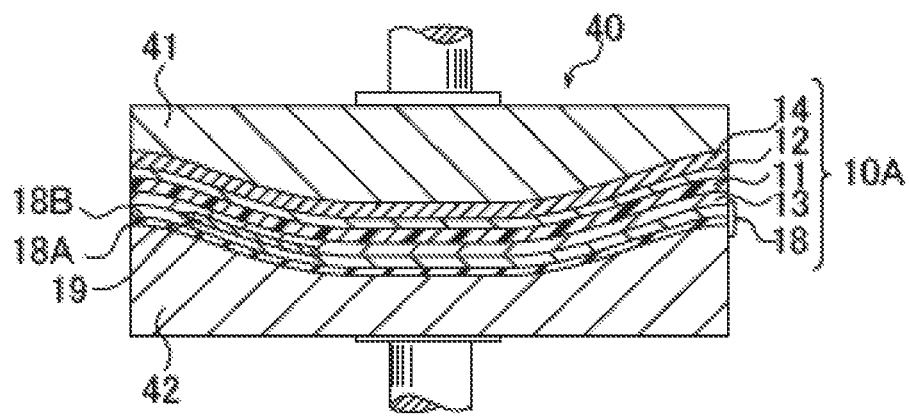

After preparing the molding material 10A, hot press molding is performed. The hot press molding is described in view of FIGS. 8A and 8B. As shown in FIG. 8A, the molding material 10A is conveyed and set to a molding dies 40, which includes an upper molding die 41 and a lower molding die 42. Once the molding material 10A is arranged between the upper molding die 41 and the lower molding die 42, a hot pressing is performed at a die temperature of 130 to 150° C., by pressing the molding material 10A between the upper molding die 41 and the lower molding die 42 as shown in FIG. 8B. The upper die 41 molds the skin layer 14, while the lower die 42 molds the air impermeable layer 18.

Figure 9A:
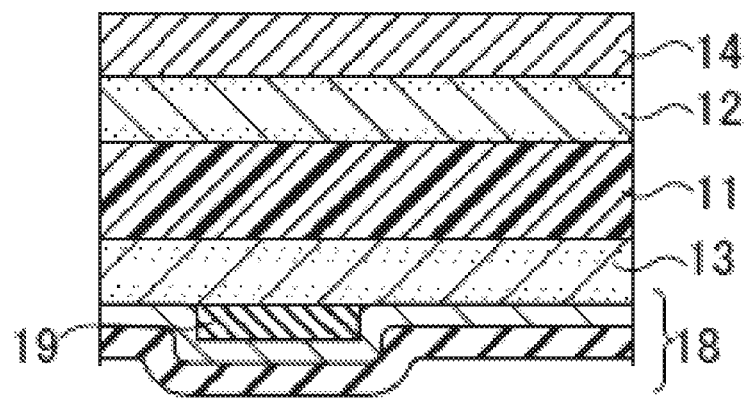
FIGS. 9A and 9B show a manufacturing process of the vehicle interior trim of the embodiment.

Then, the vehicle interior trim 10 is formed as shown in FIG. 9A. At this time, the radio signal transmission layer 19 is covered with the air impermeable layer 18. That is, the radio signal transmission layer 19 is not exposed outside.

Figure 9B:
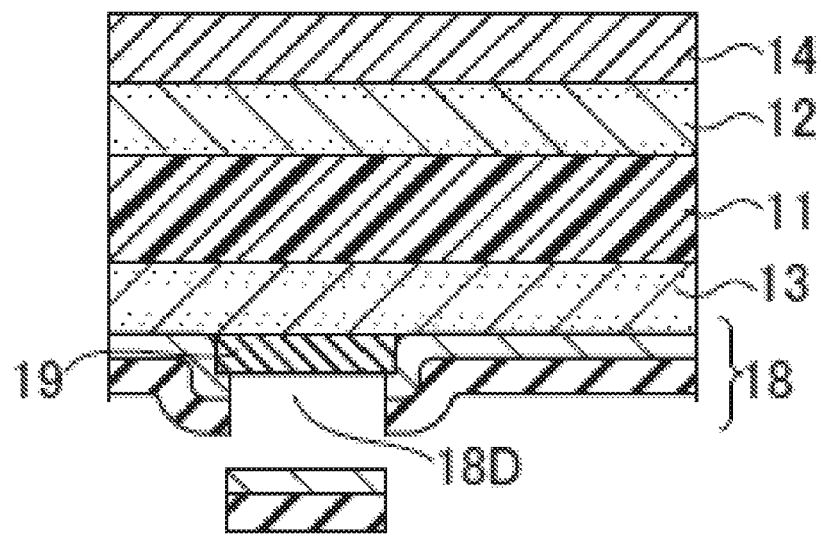

Next, as shown in FIG. 9B, a cutout 18D is formed at the air impermeable layer 18. The cutout 18D may be formed by any way such as laser cutting or using a cutter. Then, the radio signal transmission layer 19 is exposed from the cutout 18D. For forming the cutout 18D easily, the adhesive layer is not disposed between the radio signal transmission layer 19 and the air impermeable layer 18. Also, the radio signal transmission layer 19 is preferably made of material that does not strongly stick to the air impermeable layer 18 after performing the hot pressing.

The vehicle interior trim 10 according to the embodiment suppresses an increase of temperature inside a vehicle cabin as the air impermeable layer 18 covers almost entire back surface of the vehicle interior trim 10. Also, the vehicle interior trim 10 according to the embodiment allows radio signals to pass inside the vehicle cabin 24 as the radio signal transmission layer 19 is exposed from the cutout 18D.

The vehicle interior trim 10 according to the embodiment suppresses dust inside the vehicle cabin 24 to gather on the skin layer 14 as the air impermeable layer 18 does not allow air to pass through. The vehicle interior trim 10 including the radio signal transmission layer 19 that is air impermeable further suppresses dust inside the vehicle cabin 24 to gather on the skin layer 14.

REFERENCE SIGNS LIST 10 vehicle interior trim
10A molding material
11 base material layer
12 fiber layer
13 reinforcement layer
14 skin layer
18 air impermeable layer
18A metal deposition film
18B resin film
18C adhesive
18D cutout
19 radio signal transmission layer
20 vehicle
21 vehicle body
22 front wheels
23 rear wheels
24 vehicle cabin
25 roof
26 antenna.
301 front portion
302 curved portion
303A, 303B, 303C opening
40 molding dies
41 upper die
42 lower die

What is claimed is:
1. A vehicle interior trim, comprising:
a skin layer arranged toward an inside of a vehicle interior;

a base material layer arranged toward outside of the vehicle interior from the skin layer;

a reinforcement layer arranged on the base material layer;

an air impermeable layer arranged on the reinforcement layer, the air impermeable layer having one or more characteristics that interfere with a radio signal, the air impermeable layer having a cutout; and a radio signal transmission layer arranged on the reinforcement layer, the radio signal transmission layer exposed from the cutout.

2. The vehicle interior trim according to claim 1, wherein the radio signal transmission layer is air impermeable.

3. The vehicle interior trim according to claim 2, wherein the radio signal transmission layer is made of plastic sheet material, plastic injection molding component, or pressure sensitive adhesive tape.

4. The vehicle interior trim according to claim 1, further comprising:

an adhesive layer arranged between the reinforcement layer and the air impermeable layer, the adhesive layer arranged between the reinforcement layer and the radio signal transmission layer.

5. The vehicle interior trim according to claim 1, wherein the cutout is arranged in the vicinity of an antenna arranged outside of the vehicle interior from the air impermeable layer.

6. The vehicle interior trim according to claim 1, wherein the air impermeable layer includes a metal deposition film.

7. The vehicle interior trim according to claim 6, wherein the metal deposition film is made of aluminum.

8. The vehicle interior trim according to claim 2, further comprising:

an adhesive layer arranged between the reinforcement layer and the air impermeable layer, the adhesive layer arranged between the reinforcement layer and the radio signal transmission layer.

9. The vehicle interior trim according to claim 3, further comprising:

an adhesive layer arranged between the reinforcement layer and the air impermeable layer, the adhesive layer arranged between the reinforcement layer and the radio signal transmission layer.

10. The vehicle interior trim according to claim 2, wherein the cutout is arranged in the vicinity of an antenna arranged outside of the vehicle interior from the air impermeable layer.

11. The vehicle interior trim according to claim 3, wherein the cutout is arranged in the vicinity of an antenna arranged outside of the vehicle interior from the air impermeable layer.

12. The vehicle interior trim according to claim 4, wherein the cutout is arranged in the vicinity of an antenna arranged outside of the vehicle interior from the air impermeable layer.

13. The vehicle interior trim according to claim 2, wherein the air impermeable layer includes a metal deposition film.

14. The vehicle interior trim according to claim 3, wherein the air impermeable layer includes a metal deposition film.

15. The vehicle interior trim according to claim 4, wherein the air impermeable layer includes a metal deposition film.

16. The vehicle interior trim according to claim 5, wherein the air impermeable layer includes a metal deposition film.

* * * * *